(12) United States Patent
Makhija et al.

(10) Patent No.: US 12,093,819 B2
(45) Date of Patent: Sep. 17, 2024

(54) ARTIFICIAL INTELLIGENCE BASED OPERATIONS IN ENTERPRISE APPLICATION

(71) Applicant: NB Ventures, Inc., Clark, NJ (US)

(72) Inventors: Subhash Makhija, Westfield, NJ (US); Nithin Maruthi Prasad, Avenel, NJ (US); Huzaifa Shabbir Matawala, East Brunswick, NJ (US); Shivendra Singh Malik, Vasco-da-Gama (IN)

(73) Assignee: NB Ventures, Inc.

( * ) Notice: Subject to any disclaimer, the term of this patent is extended or adjusted under 35 U.S.C. 154(b) by 943 days.

(21) Appl. No.: 17/126,869

(22) Filed: Dec. 18, 2020

(65) Prior Publication Data

US 2022/0198256 A1 Jun. 23, 2022

(51) Int. Cl.
| | |
|---|---|
| G06N 3/08 | (2023.01) |
| G06F 16/23 | (2019.01) |
| G06F 16/28 | (2019.01) |
| G06F 21/64 | (2013.01) |
| G06F 40/166 | (2020.01) |
| G06N 3/04 | (2023.01) |
| G06Q 10/0631 | (2023.01) |
| G06Q 10/0635 | (2023.01) |
| G06Q 10/0637 | (2023.01) |
| G06Q 10/08 | (2023.01) |
| H04L 9/40 | (2022.01) |

(52) U.S. Cl.
CPC .......... *G06N 3/08* (2013.01); *G06F 16/2379* (2019.01); *G06F 16/285* (2019.01); *G06F 21/64* (2013.01); *G06F 40/166* (2020.01); *G06N 3/04* (2013.01); *G06Q 10/06315* (2013.01); *G06Q 10/0635* (2013.01); *G06Q 10/06375* (2013.01); *G06Q 10/08* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 11,315,031 B2 * | 4/2022 | Strachan | G06Q 10/063114 |
| 2014/0279304 A1 * | 9/2014 | Lall | G06F 16/24564 705/30 |
| 2020/0076843 A1 * | 3/2020 | Luiggi | H04L 63/1425 |

FOREIGN PATENT DOCUMENTS

| | | | | |
|---|---|---|---|---|
| CA | 3098703 A1 * | 11/2019 | | G06F 9/5061 |
| WO | WO-2017027031 A1 * | 2/2017 | | G06F 21/562 |
| WO | WO-2021032598 A1 * | 2/2021 | | G06F 16/254 |

* cited by examiner

*Primary Examiner* — Alan Chen
(74) *Attorney, Agent, or Firm* — BrownWinick Law Firm; David M. Breiner

(57) ABSTRACT

The present invention provides a system and method for managing operations in an enterprise application. The invention includes predicting a dataset characteristic such as an incident or outage in the enterprise application based on analysis of the dataset received from distinct data sources. The invention includes data cleansing, feature extraction based on probability data analysis and classification of dataset based on data models trained on historical dataset characteristic data. The invention includes linkedchain based architecture with configurable components structuring the enterprise application.

34 Claims, 10 Drawing Sheets

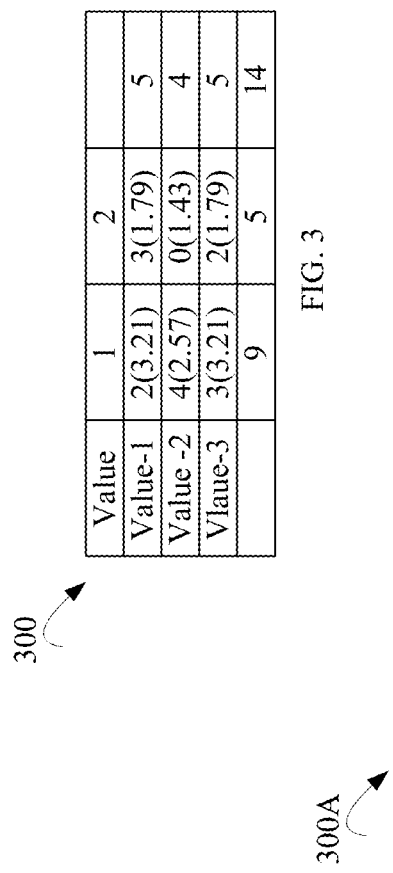

ARTIFICIAL INTELLIGENCE BASED OPERATIONS IN ENTERPRISE APPLICATION

BACKGROUND

1. Technical Field

The present invention relates generally to artificial intelligence (AI) based operations in enterprise applications. More particularly, the invention relates to systems, methods and computer program product for managing one or more operations of an enterprise application.

2. Description of the Prior Art

Enterprise applications supporting execution of multiple functions that are interdependent on each other must deal with incidents or outage or real time alterations in functions that impact operations. The impact of such real time alterations may be negative or positive depending on the information conveyed through the data flowing in the enterprise application.

In case of negative impacts, any incident occurring in the enterprise application may impact multiple functions thereby leading to inefficient functioning and wastage of precious time. Moreover, certain incidents or outages may impact critical functions beyond repair such as any security outage may compromise confidential data. For enterprise application such as procurement or supply chain applications such outage becomes more critical as the complexity of functions makes it nearly impossible to determine the affected functions in case of an incident.

Regardless of the nature of the impact, data analysis for identifying an alteration including an outage or incident or even a positive impact to adjust the affected functions is extremely difficult due to the underlining structure of the enterprise applications itself. In case of Supply chain, each function is a huge application that deals with multiple sub-components of the application for execution. Analyzing data of such enterprise applications and relating it to associated functions is a tedious task which may require re-structuring of inherent characteristics of element in the application itself. Moreover, any real time alteration in the function due to any dynamically changing activity say an outage needs accurate prediction and identification of affected function for enabling appropriate adjustments to the operation. Also, the datasets to be processed for identifying alterations including outage vary in nature. Some prior arts try to predict incidents based on logs, but they never relate to the actual functions in the application. None of the prior arts address the inherent technical issues with other datasets that are flowing in the enterprise application. Moreover, the impact of any dataset may require positive or negative adjustment to an operation for execution of tasks to be carried out through the enterprise application which requires distinct processing of each dataset for identifying the information that is being conveyed. Further, it becomes extremely critical for computing systems to have capability of understanding the information and also to accommodate for real time data fluctuations to predict operational or infrastructural adjustments that may be required for future execution of the tasks.

In view of the above problems, there is a need for system and method of data processing for managing one or more operations of an enterprise application that can overcome the problems associated with the prior arts.

SUMMARY

According to an embodiment, the present invention provides a method for managing one or more operations in an enterprise application. The method includes receiving at a server, one or more dataset from at least one source, cleansing the received dataset and storing the cleansed dataset in an operational database, extracting one or more feature from the cleansed dataset based on probability data analysis of the extracted feature to generate extracted feature dataset, classifying the extracted feature dataset based on a correlation obtained from one or more data models trained on a historical dataset; and identifying by an AI engine, impact of the classified data on one or more operations of the enterprise application to predict characteristics of the dataset.

In an embodiment, the invention provides a system for managing one or more operations in an enterprise application, the system comprises a data cleansing tool configured for cleansing one or more dataset received from at least one data source; a feature extractor configured for extracting one or more feature from the cleansed dataset based on probability data analysis of the extracted feature to generate extracted feature dataset; a data classification tool coupled to a neural network and configured for classifying the extracted feature dataset based on a correlation obtained from one or more data models trained on a historical dataset; and an AI engine coupled to a processor and configured for identifying an impact of the classified data on one or more operations of the enterprise application to predict characteristics of the dataset.

In a related embodiment, the characteristic of the dataset includes intent of an information conveyed through the dataset wherein the characteristics and impact enable the AI engine to predict in real time one or more adjustments required in execution of the impacted operations and at least one infrastructure capacity associated with those operations.

In an embodiment the system of the invention includes one or more linkedchain nodes configured to connect the one or more operations of the enterprise application wherein the AI engine identifies impact of the classified dataset on the one or more linkedchain nodes based on a data pattern analysis. The system provides a linkedchain configured to connect the dataset to one or more linkedchain nodes of the enterprise applications through a linkedchain control module thereby enabling the control module to incorporate changes in the one or more operations of the application in real time based on the impact and the predicted characteristics of the dataset. The linkedchain nodes connect to the one or more operations through configurable components of the enterprise application wherein the AI engine corelates the dataset with the one or more linkedchain nodes based on a data script created by utilizing a library of functions stored on a functional database.

In an embodiment, the present invention provides a non-transitory computer-readable storage medium coupled to one or more processors and having instructions stored thereon which, when executed by the one or more processors, cause the one or more processors to perform method of managing one or more operations in an enterprise application.

In an advantageous aspect, the present invention utilizes Machine Learning algorithms, prediction data models, neural network, linkedchain and data analysis.

BRIEF DESCRIPTION OF THE DRAWINGS

The disclosure will be better understood and when consideration is given to the drawings and the detailed description which follows. Such description makes reference to the annexed drawings wherein:

FIG. 3 is a contingency table for an extracted feature from a received dataset in accordance with an embodiment of the invention.

FIG. 3A is a sparse matrix of extracted features for classification in accordance with an embodiment of the invention.

DETAILED DESCRIPTION

Figure 1:
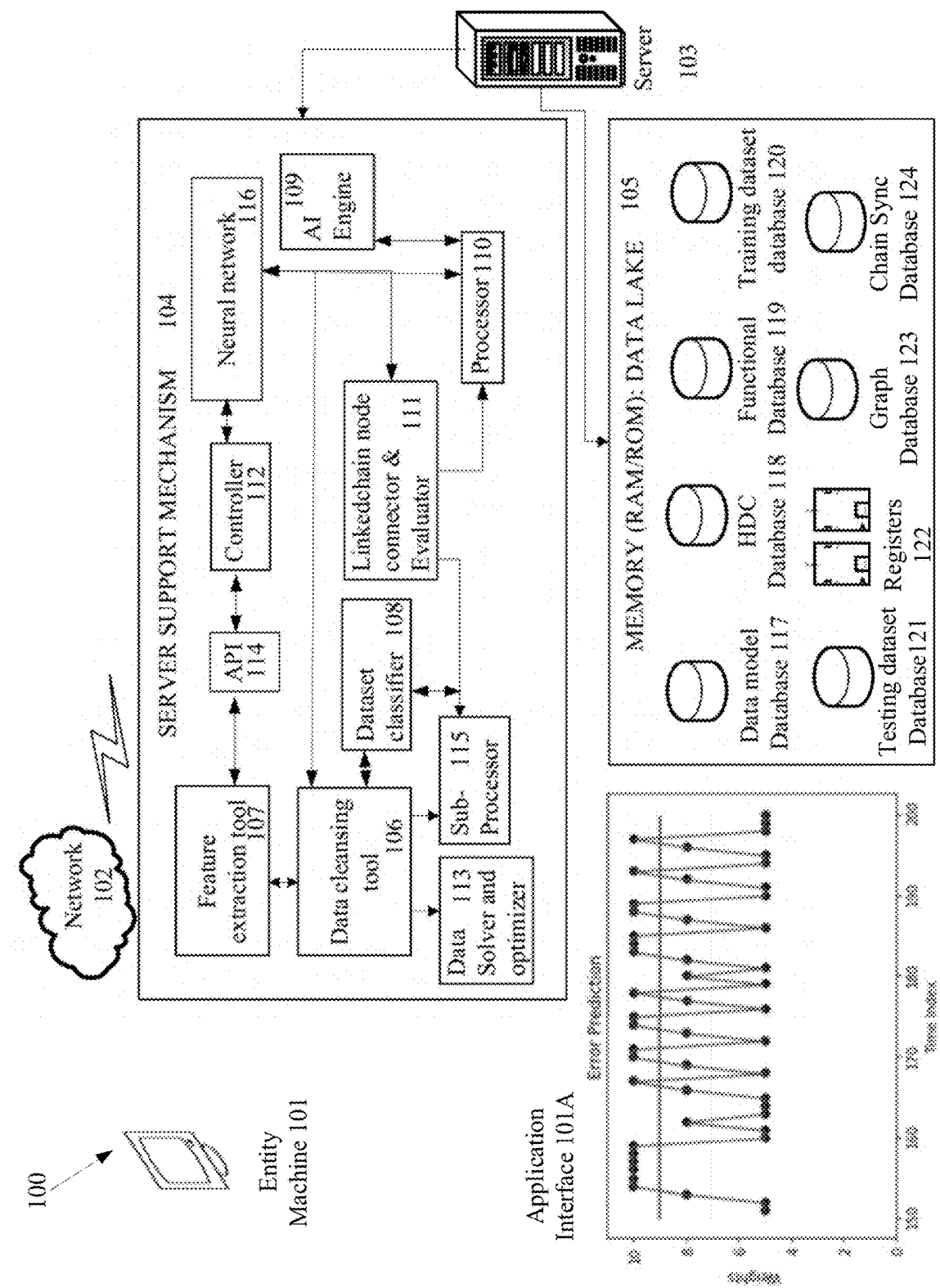
FIG. 1 is a view of a data processing system for managing one or more operations in an enterprise application in accordance with an embodiment of the invention.

Described herein are the various embodiments of the present invention, which includes data processing method and system for managing one or more operations in an enterprise application for supply chain management.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "linkedchain," "data attribute," or "data lake," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for managing one or more operations in an enterprise application for supply chain management.

Referring to FIG. 1, a system 100 for managing one or more operations in an enterprise application is provided in accordance with an embodiment of the present invention. The system 100 includes at least one entity machine 101 with a user interface 101A for sending, receiving, modifying or triggering processing of one or more datasets over a network 102. The system includes a server 103 configured to receive data and instructions from the entity machine 101. The system 100 includes a support mechanism 104 for performing prediction and mitigation process with multiple functions including historical dataset extraction, classification of historical datasets, artificial intelligence based processing of new datasets and structuring of data attributes for analysis of data, creation of one or more data models configured to process different parameters including event data, impact data etc. The system 100 includes a data store/data lake 105 for accessing item or services related data, dataset characteristic related historical data, and storing plurality of training data models created by support mechanism 104.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in a number of different forms, for example, as a smartphone, computer, personal digital assistant, or other similar devices.

In an exemplary embodiment, the user interface 101A of the entity machine 101 enables cognitive computing to improve interaction between user and an enterprise or supply chain application(s). The interface 101A improves the ability of a user to use the computer machine itself. Since, the interface 101A provides actionable insights into various category of dataset characteristics and impacted functions/operation of the enterprise application including but not limited to dataset characteristic conveying security outage, functional disruption, operational advancement, event data with positive turn of events, graphical representation of impacted linkedchain nodes etc., at the same instant, the interface thereby enables a user to take informed decision or undertake an appropriate strategy for adjusting execution of operations based on the impact on identified functions. The user interface 101A triggers a plurality of mitigation processes based on the impacted operations data. By eliminating multiple layers, processing tasks and recordation of information to get a desired data or mitigation functionality, which would be slow, complex and impractical to learn, the user interface 101A is more user friendly and improves the functioning of the existing computer systems.

In an example embodiment, the support mechanism 104 of the system 100 includes a control interface for accessing dataset characteristics related information received at the server 103. The support mechanism 104 enables implementation of the system 100 on top of a restructured linkedchain based architecture for predicting characteristic of dataset and adjusting execution of related operations in the enterprise application. The artificial intelligence (AI) based system 100 enabling codeless development of functions with support mechanism 104 provide configurable components, that run independently as well as interdependently from each other depending on the operation to be executed, while exchanging data. The system 100 reconfigures linkedchain node connections depending on the one or more operations to be executed.

The support mechanism includes a data cleansing tool 106 configured for cleansing a received dataset by removing unwanted text from the dataset and a feature extractor/feature extraction tool 107 for extracting one or more features from cleansed dataset based on probability data analysis of the extracted feature to generate extracted feature dataset. The support mechanism 104 further includes a data/dataset classifier/data classification tool 108 for classifying the extracted feature dataset. The mechanism 104 includes an AI engine 109 coupled to a processor 110 and configured for identifying an impact of the classified data on one or more operations of the enterprise application to predict characteristic of the dataset. The mechanism 104 includes a linkedchain node connector and evaluator engine 111 configured to enable one or more linkedchain nodes to connect the one or more operations of the enterprise application. The mechanism includes a controller 112 encoded with instructions enabling the controller to function as a bot for processing a mitigation data script to recommend a mitigation action based on a dynamic processing logic. Further, the controller 112 generates sub-learning data models from the one or more data models for assessing impact of dataset characteristic in sub-components of the enterprise application. Further, a historical dataset characteristic data stored in a historical characteristic database and the classified data are processed by the processor coupled to the AI engine for predicting the characteristic thereby enabling recommendation of adjustment actions. The mechanism 104 includes a data solver and optimizer 113 for processing variables and data model optimization parameters. The data solver and optimizer 113 is configured for identifying constraint associated with execution of one or more operations before processing the historical characteristic datasets. The constraints act as parameters that may obstruct execution of the operations based on unknown or newly identified parameters. These constraints may be obtained from data sources such as newsfeeds. The mechanism 104 includes an application programming interface (API) 114 for triggering the one or more data models through the processor 110 for carrying out the operation in enterprise application. Since, prediction of dataset characteristics and adjustment of operations include multiple functions within the prediction operation like data cleansing, enrichment, extraction, classification etc., the support mechanism 104 includes sub-processors 115 for carrying out multiple tasks simultaneously. The mechanism includes a neural network 116 coupled to the controller 112 and configured to identify one or more data attribute weights assigned to the classified dataset by the one or more data models. The classified dataset is an input to the neural network 116 and output is a testing dataset.

In an exemplary embodiment, apart from application user interface, output of the system is exposed as API for third party digital platforms and applications. The API is also consumed by bots and mobile applications.

In example embodiment the server 103 shall include electronic circuitry for enabling execution of various steps by the processor 110. The electronic circuitry has various elements including but not limited to a plurality of arithmetic logic units (ALU) and floating-point Units (FPU's). The ALU enables processing of binary integers to assist in formation of at least one table of data attributes where the data models implemented for dataset characteristic prediction are applied to the data table for obtaining prediction data and recommending action to avert risks. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low speed interface connecting to low speed bus and storage device. Each of the components of the electronic circuitry, are interconnected using various busses, and may be mounted on a common motherboard or in other manners as appropriate. The processor 110 can process instructions for execution within the server 103, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a front-end web server communicatively coupled to at least one database server, where the front-end web server is configured to process the dataset characteristic data based on one or more prediction data models and applying an AI based dynamic processing logic to automate mitigation actions.

The processor 110 may be implemented as a chipset of chips that include separate and multiple analog and digital processors. The processor 110 may provide coordination of the other components, such as controlling user interfaces, applications run by devices, and wireless communication by devices.

The Processor 110 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user/demand planner and convert them for submission to the processor 110. In addition, an external interface may be provided in communication with processor 110, so as to enable near area communication of device with other devices. External interface may provide, for example, for wired communication in some implementations, or for wireless communication in other implementations, and multiple interfaces may also be used.

In an embodiment, the present invention uses GPUs (Graphical processing units) for enabling AI engine 109 to provide computing power to processes humongous amount of data.

In an exemplary embodiment, the AI engine 109 employs machine learning techniques that learn patterns and generate insights from the data. Further, the AI engine 109 with ML employs deep learning that utilizes artificial neural networks to mimic biological neural network in human brains. The artificial neural networks analyze data to determine associations and provide meaning to unidentified or new dataset.

In another embodiment, the invention enables integration of Application Programming Interfaces (APIs) 114 for plugging aspects of AI into the dataset characteristic prediction and operations execution through the enterprise application.

Referring to FIG. 1, the various elements like the support mechanism 104 and the data lake/memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the data lake/memory data store/data lake 105 either alone or in various combinations may be part of a server system as other external connections.

In an example embodiment, the data lake/memory data store 105 includes plurality of databases as shown in FIG. 1. The data store/ data lake 105 includes a data model (DM) database 117 storing one or more training and prediction data models for predicting dataset characteristics or intent such as outage or incidents in enterprise application, a historical dataset characteristics (HDC) database 118 storing dataset characteristics related historical data from one or more historical operational data and entity machines, a functional database 119 configured for storing a library of functions enabling generation of a data script configured to corelate a dataset with one or more linkedchain nodes. The data script is generated based on prediction analysis, and deep learning performed on dataset in historical characteristic database. The data lake 105 includes a training dataset database 120 and a testing dataset database 121 for storing training data and testing data obtained from the historical dataset characteristic data. The prediction data for the testing data set is generated using the training data set through the one or more data models. The data lake 105 further includes a plurality of registers 122 as part of the memory data store/data lake 105 for temporarily storing data from various databases to enable transfer of data by a processor between the databases as per the instructions of the AI engine 109. The data lake 105 includes a graph database 123 configured for storing graphical data model for data pattern analysis where dynamically changing data attribute weights automatically assigned to the data model based on frequency of occurrence of the dataset characteristic or intent such as an incident or outage data are analyzed and processed as additional filters to predict the future characteristics. The data lake also includes a linkedchain sync database 124 configured to store a plurality of sync data for linking the dataset with the linkedchain nodes of the enterprise application.

In an embodiment, the historical dataset characteristic data is linear or non-linear time series data set related to various types of datasets including but not limited to datasets such as newsfeed, logs like application logs, system log etc., real time system messages, application messages, operational messages by TOT devices in real time etc.

The system further analyzes historical data through the application interface 101A and perform AI based predictions of dataset characteristics or intent conveying say incidence or system outage etc., by overlaying a historical outage data with disparate data models built on various data sources available to analyze outage trends for one or more operations of the enterprise application.

The memory data store/data lake 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The dataset characteristic or intent prediction, management and operational adjustment system enable more secured process considering the issues inherent with cloud environments.

In an embodiment, the entity or user includes a client, one or more operation of an Enterprise application automatically generating the dataset on execution of a supply chain function.

In an exemplary embodiment, the system of the present invention is configured for analyzing impact of a plurality of varying parameters (changes weather, negative newsfeeds etc.) on dataset characteristic prediction. The varying parameters include market dynamics and internal drivers across products, commodities, and business units/plants across various Regions.

Figure 1A:
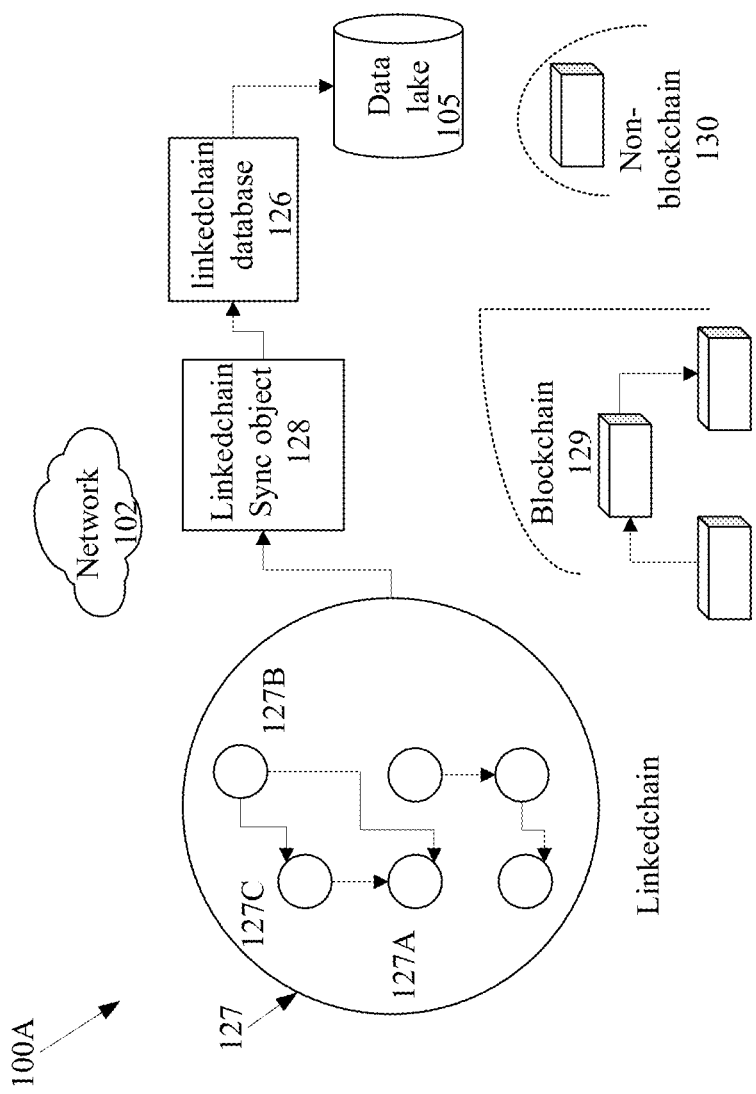
FIG. 1A is a sub architecture of a system with configurable components enabling linkedchain node implementation of enterprise application in accordance with an example embodiment of the invention.

Referring to FIG. 1A, a sub-architecture 100A of a system with configurable components enabling linkedchain node implementation of enterprise application is shown in accordance with an embodiment of the invention. The architecture includes a linkedchain 127 configured to connect dataset to one or more linkedchain nodes (127A, 127B, 127C) through a linkedchain control module, where the control module is configured to incorporate changes in the one or more operations of the enterprise application in real time based on the impact and the predicted characteristic of the dataset. The linkedchain nodes (127A, 127B, 127C) are configured to connect the one or more operations of the enterprise application through configurable system and application components. Referring to FIGS. 1 and 1A, the AI engine 110 identifies the impact of the classified dataset on the one or more linkedchain nodes (127A, 127B, 127C) based on data pattern analysis. Also, the AI engine 110 corelates the received dataset with the one or more linkedchain nodes (127A, 127B, 127C) based on a data script created by utilizing a library of functions stored on the functional database 119. The system architecture 100A includes a linkedchain sync object 128 of the linkedchain nodes (127A, 127B, 127C) configured to synchronize the control module with the received dataset. The linkedchain sync database 126 in the data lake 105 is configured to store a plurality of sync data for linking the dataset with the linkedchain nodes (127A, 127B, 127C).

In an advantageous aspect, the enterprise application is developed with configurable components by a platform architecture configured for codeless development of the application thereby enabling the system to reconfigure linkedchain node connections depending on the one or more operations to be executed.

In an embodiment, the one or more operations include demand planning, supply planning, inventory management, warehouse management, forecasting, cost modelling, transportation management, product life cycle management, purchase Order and sales management, work order management, receivables, supplier collaboration management, in the enterprise application including an ERP or a supply chain management application.

In an exemplary embodiment, the linkedchain nodes (127A, 127B, 127C) are a blockchain network nodes connected to one or more data blocks of the blockchain network 129. Further, in an example, a prediction of a security outage by the AI engine 110 triggers the block chain network nodes to identify associated operations of the application impacted by the outage and initiating a mitigation action to mitigate the risk associated with execution of the impacted nodes and operations of the enterprise application.

In another exemplary embodiment, the linkedchain nodes are non-blockchain network nodes configured to authenticate the received dataset before connecting one or more data blocks of non-blockchain network 130 to the dataset through the control module.

Figure 1B:
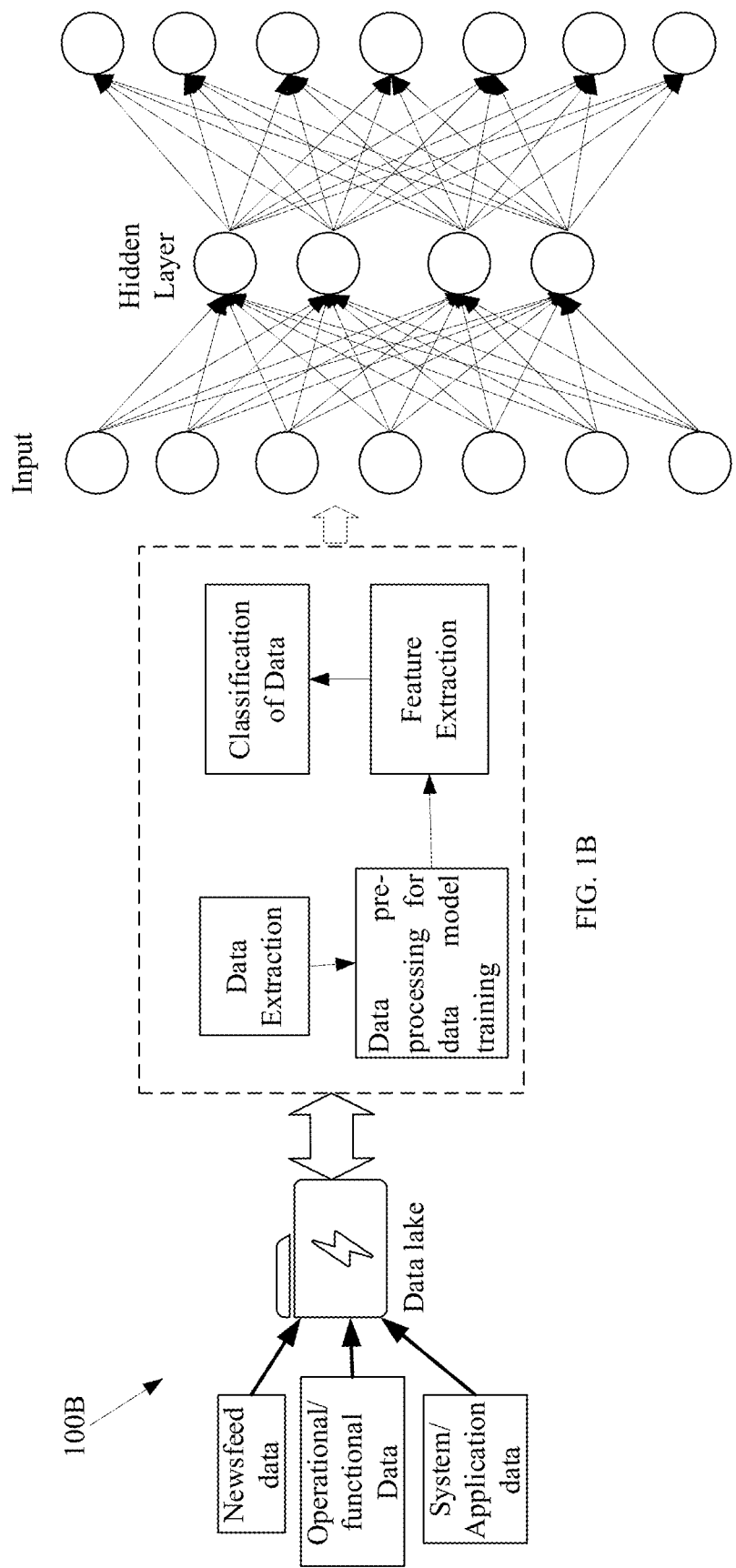
FIG. 1B is a block diagram of an Artificial Intelligence based system in accordance with an embodiment of the invention.

Referring to FIG. 1B a block diagram 100B of a dataset characteristic prediction system is shown in accordance with an embodiment of the invention. The prediction system provides a data lake 105 receiving dataset from multiple data sources including but not limited to newsfeed data, operational or functional data, application or system data etc. The nature of dataset is distinct in type and structure which makes it extremely complex to process information conveyed through the dataset. Moreover, such data needs to be organized, processed and stored with configurable components creating an underlying artificial intelligence (AI) based layer for deriving actionable insights from the dataset to perform a mitigation action depending on the predicted outage. The block diagram shows data extraction, data pre-processing for one or more data model training, feature extraction, classification of data and neural network for assigning data attribute weights to a dataset received at the server.

Figure 1C:
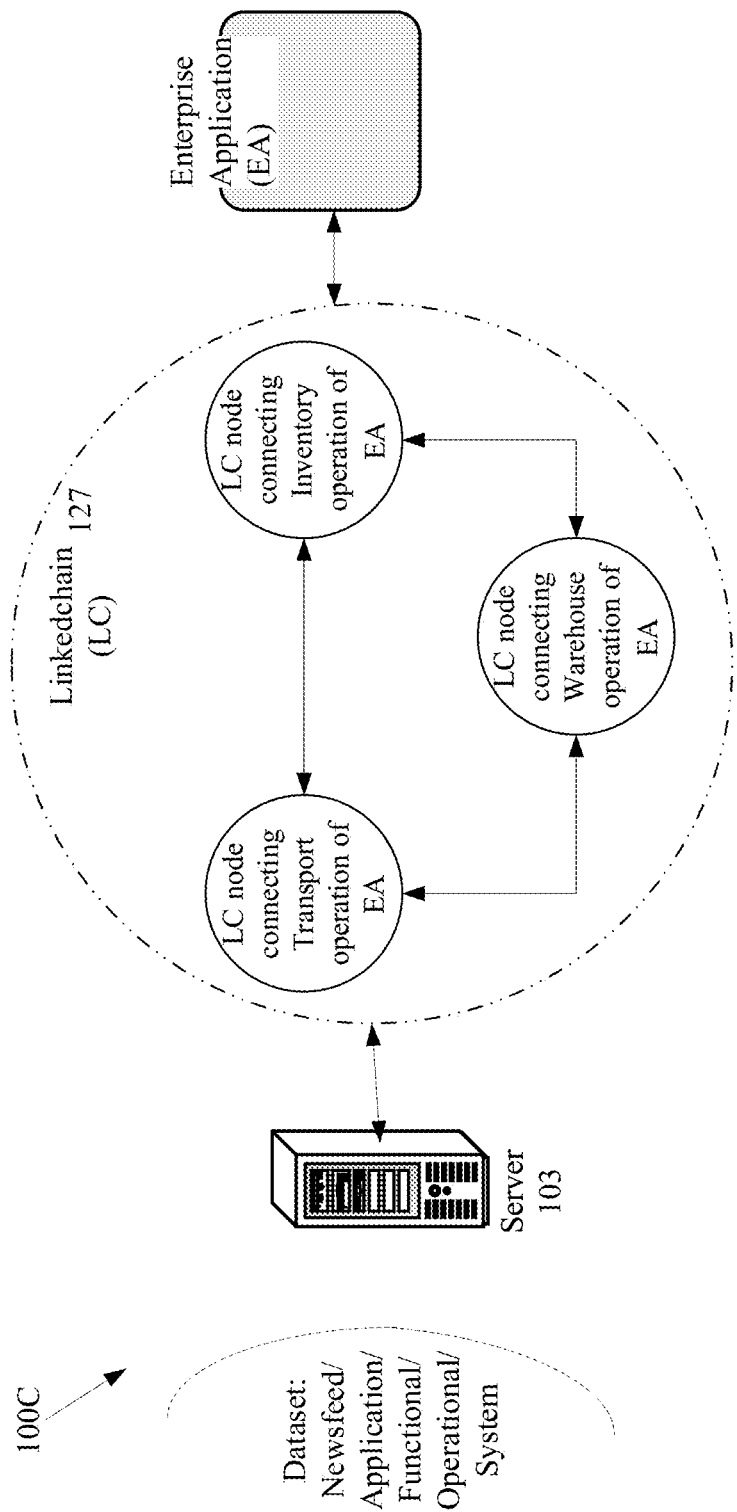
FIG. 1C is a linkedchain based application architecture for managing one or more operations of enterprise application in accordance with an embodiment of the invention.

In an example embodiment, the system of the present invention derives relationships between datasets and one or more operations of the enterprise application by a linkedchain based application architecture 100C as shown in FIG. 1C. The operations have a commonality with the dataset received at the server. For example: In case a transport operation executes transportation of an item from one point to another, the application expects the delivery of the item in an expected timeframe. However, a change in the route due to say traffic congestion will notify the application through a system message about the route. In such a scenario, the system of the present invention is configured to derive the meaning of the message and identify the linked operations that may be impacted due to this real time change. The operations linked to the transportation function such as inventory and warehouse will also be impacted due to the occurrence of such an event. So if the event is generated, the system knows to raise an alarm that the load will be delayed to the warehouse, which will also distort other supply chain factors like demand planning, supply planning, inventory management, warehouse management, forecasting, cost modelling, transportation management, product life cycle management, purchase Order and sales management. Moreover, the linkedchain nodes enables implementation of the mitigation action by alerting the other functions accordingly and automatically adjusting the related operational parameters.

In another example embodiment, the system predicts operation timelines for a function in the enterprise application. For example, if a user imitates an operation to get an object say corn flakes or automobile component or any other object through the application, the system is configured to predict when it will be delivered. Every truck picking corn from a farmer generates an dataset like an event dataset as: Eventdata: {Datatype: "Truck1Start"; Source: "cornFarm1"; Destination: "warehouse1"; status: "YetToStart"}. Since, the one or more data models are trained for the event data, the object is expected to be delivered to the warehouse. However, sometime later another event dataset is generated as: "Truck1Start"; Source: "cornFarm1"; Destination: "warehouse1"; status: "Started"; route taken: "Point "A" to point "B" via point "C"}. Since, the data models may not be trained of the new event of change in route, the AI engine enables processing of this information in conjunction with the neural network for prediction. Further, the neural network utilizes this data to generate the training dataset for the data model and retrains itself. The retrained model is trained to expect any new event dataset during the route as well. This prediction of dataset characteristic impacting operations in the enterprise application is exemplary and an underlining linkedchain based architecture supporting the enterprise application enables fast execution of adjustment action and upsizing or downsizing requirement of infrastructure capacity as well. The linkedchain based architecture executes such infrastructure capacity requirements without affecting associated functions of the enterprise application. Also, this is extremely advantageous when catering to third party applications interacting with the enterprise application, as the linkedchain architecture ensure appropriate safeguards at the required nodes without impacting other functions in the enterprise applications.

Figure 2:
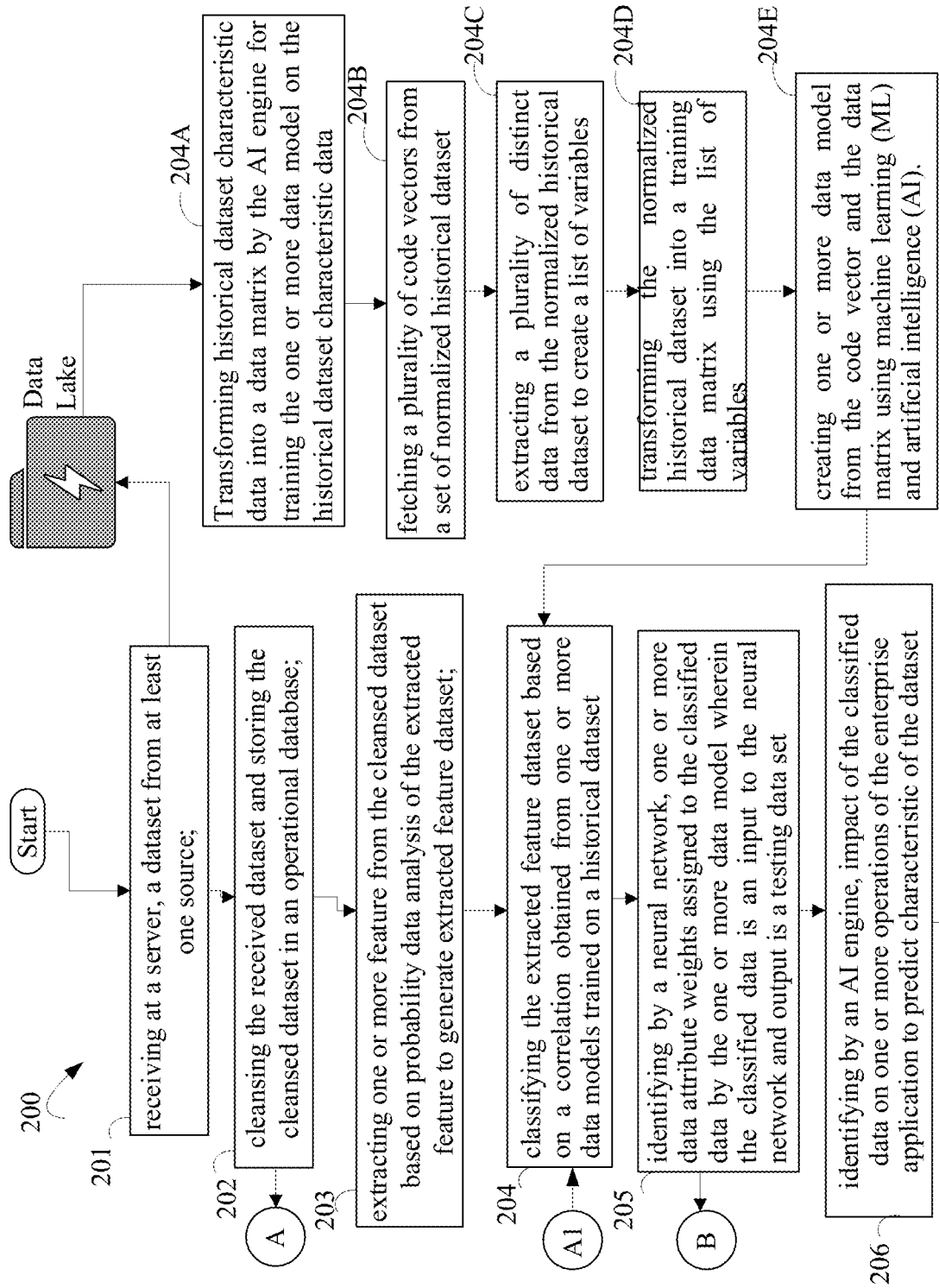
FIG. 2 is a flowchart depicting a method of managing one or more operations in accordance with an embodiment of the invention.
Figure 2A:
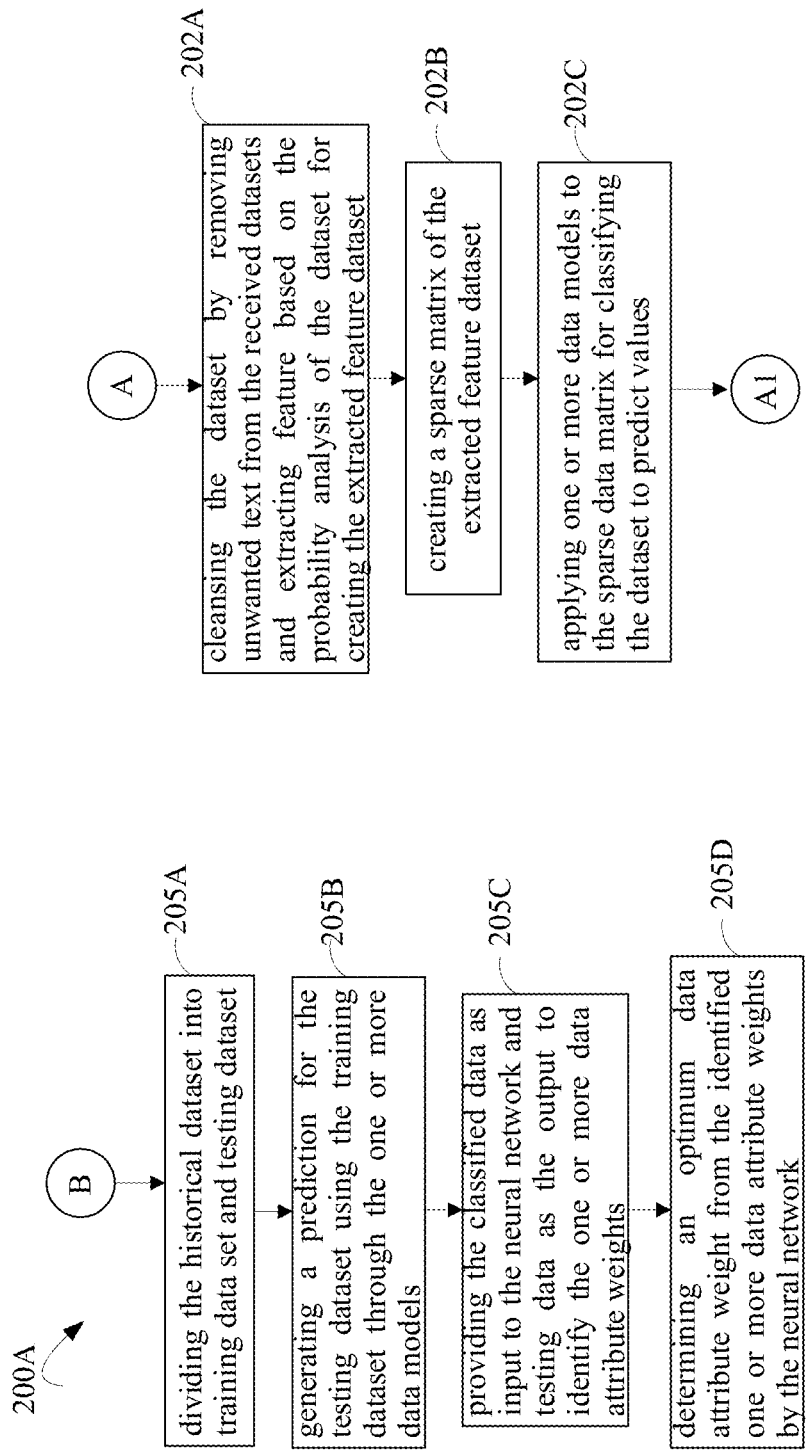
FIG. 2A is a flowchart depicting method of determining optimum data attribute weight from a neural network in accordance with an embodiment of the invention.

Referring to FIG. 2 and FIG. 2A, flowchart (200, 200A) depicting a method of managing one or more operations in an enterprise application is provided in accordance with an embodiment of the present invention. The method includes the steps of 201 receiving at a server, one or more dataset from at least one source, in step 202 cleansing the received dataset and storing the cleansed dataset in an operational database. In step 203 extracting one or more feature from the cleansed dataset based on probability data analysis of the extracted feature to generate extracted feature dataset. In step 204, classifying the extracted feature dataset based on a correlation obtained from one or more data models trained on a historical dataset. In step 205, identifying by a neural network, one or more data attribute weights assigned to the classified data by the one or more data model wherein the classified data is an input to the neural network and output is a testing data set and in step 206 identifying by an AI engine, impact of the classified data on one or more operations of the enterprise application to predict characteristic of dataset.

In a related embodiment, the method of the invention includes execution of an adjustment or mitigation action where linkedchain based system architecture with configurable components enable identification of operations impacted by the predicted dataset characteristic such as an incident or outage for alerting the associated functions/units/object to undertake adjustment or mitigation actions.

In a related embodiment, the method of the invention includes the step 202A of cleansing the dataset by removing unwanted text from the received datasets and extracting feature based on the probability analysis of the dataset for creating the extracted feature dataset. In step 202B creating a sparse matrix of the extracted feature dataset; and in step 202C applying one or more data models to the sparse data matrix for classifying the dataset to predict values.

In another related embodiment the present invention trains the one or more data models. In step 204A the method transforms historical characteristic dataset into a data matrix by the AI engine for training the one or more data model on the historical characteristic dataset. In step 204B, the method fetches a plurality of code vectors from a set of normalized historical dataset. In step 204C, extracting a plurality of distinct data from the normalized historical dataset to create a list of variables. In step 204D, transforming the normalized historical dataset into a training data matrix using the list of variables and in step 204E creating one or more data model from the code vector and the data matrix using machine learning (ML) and artificial intelligence (AI).

In an exemplary embodiment, the method of creating the one or more data models further includes reading the training data matrix and the plurality of code vectors, applying Naive Bayes (NB) algorithm to train a Bayes model for the normalized historical dataset by using machine learning engine (MLE), applying Support Vector Machine (SVM) algorithm to obtain SVM models by using machine learning engine (MLE), applying Logistic Regression (LR) algorithms to obtain LR models by using machine learning engine (MLE); and saving NB, SVM and LR models as the data models for classification of received dataset in a data model database.

In another related embodiment, the method of the invention provides optimum data attributes through one or more data models. The invention includes step 205A of dividing the historical dataset into training data set and testing data set. In step 205B generating a prediction for the testing dataset using the training dataset through the one or more data models. In step 205C providing the classified data as input to the neural network and testing data as the output to identify the one or more data attribute weights and in step 205D determining the optimum data attribute weight from the identified one or more data attribute weights by the neural network.

In an exemplary embodiment, the data attribute weights vary dynamically depending on frequency of occurrence of the dataset characteristic over a time period where the AI engine is configured to modify the weights assigned to the dataset for predicting the characteristic enabling initiation of adjustment or mitigation action based on the data attribute weight data pattern analysis through a bot.

In an embodiment the invention processes a historical dataset characteristic data and the classified data to predict the characteristic for recommending the adjustment or mitigation action based on a dynamic processing logic. The dynamic processing logic integrates deep learning, predictive analysis, data extraction, impact analysis, configuration pattern generation and bots for processing the classified dataset and historical dataset characteristic data to recommend the action.

The present invention provides a dataset characteristic prediction system with a single codebase for scalable execution. The system supports accurate prediction and extends to many different learners. The system enables task parallelism as well as intelligent materialization and reuse of intermediate results. Additionally, the system enables integration of deep neural network for more accurate data models.

In an embodiment, the characteristic of the dataset includes intent of an information conveyed through the dataset where the characteristics and impact enable the AI engine to predict in real time one or more adjustments required in execution of the impacted operations and at least one infrastructure capacity associated with those operations.

In a related embodiment, the infrastructure capacity includes sizing of compute services, databases, network bandwidth, sizing of operational objects configured to execute the one or more operations. Since, infrastructure capacity and sizing for enterprise application is very complex, the system and method of the present invention advantageously predicts Infrastructure Capacity and Monitors the requirements in real time based on dynamically changing operation or event data. The dataset may be any data in the enterprise application, conveying occurrence of an event in the application and the AI based system analyses the characteristic of the dataset to determine the intent and enables execution of operations with adjustment actions.

In an example embodiment, the feature extraction on probability analysis is performed by:

$$\chi^2 = \sum_{i=1}^{m} \sum_{j=1}^{k} \frac{(O_{ij} - E_{ij})^2}{E_{ij}}$$

where, x is extracted feature value, Oi is observed frequency value and Ei is expected frequency value. Further, the more the extracted feature value the more is the output dependent on the feature. The values which are in brackets are expected values. For each cell we calculate the extracted feature value and add all the values to get the prediction value for feature. The dependency of features is determined through the probability analysis based on the assumption that the given distributions are independent. For each feature a contingency table 300 (FIG. 3) is generated and expected values are determined for each cell.

Referring to FIG. 3A, a sparse matrix 300A of extracted features is shown in accordance with an embodiment of the invention. The sparse matrix is created with words as columns and the occurrence of each word in the row is determined before applying one or more data models to classify the dataset. For example, words related to enterprise application functions, messages floating within the application, like "and", "transport", "inventory", "approval", "invoice", "demand", "supply", etc., are analyzed.

In an exemplary embodiment, each learner has a feature transformation flow as well as pre and post processing logic associated with it. The feature transformation turns data into sparse matrices and provides customized as well as standard transformations (crossing, binning, normalization, etc.) along the way. The learner invocation consists of a training and a prediction phase, where the former phase uses statistics-based data models and additive model-based libraries, and the latter applies sampling methods. The outputs of all learners are then consolidated into a single set of sample paths.

Figure 4:
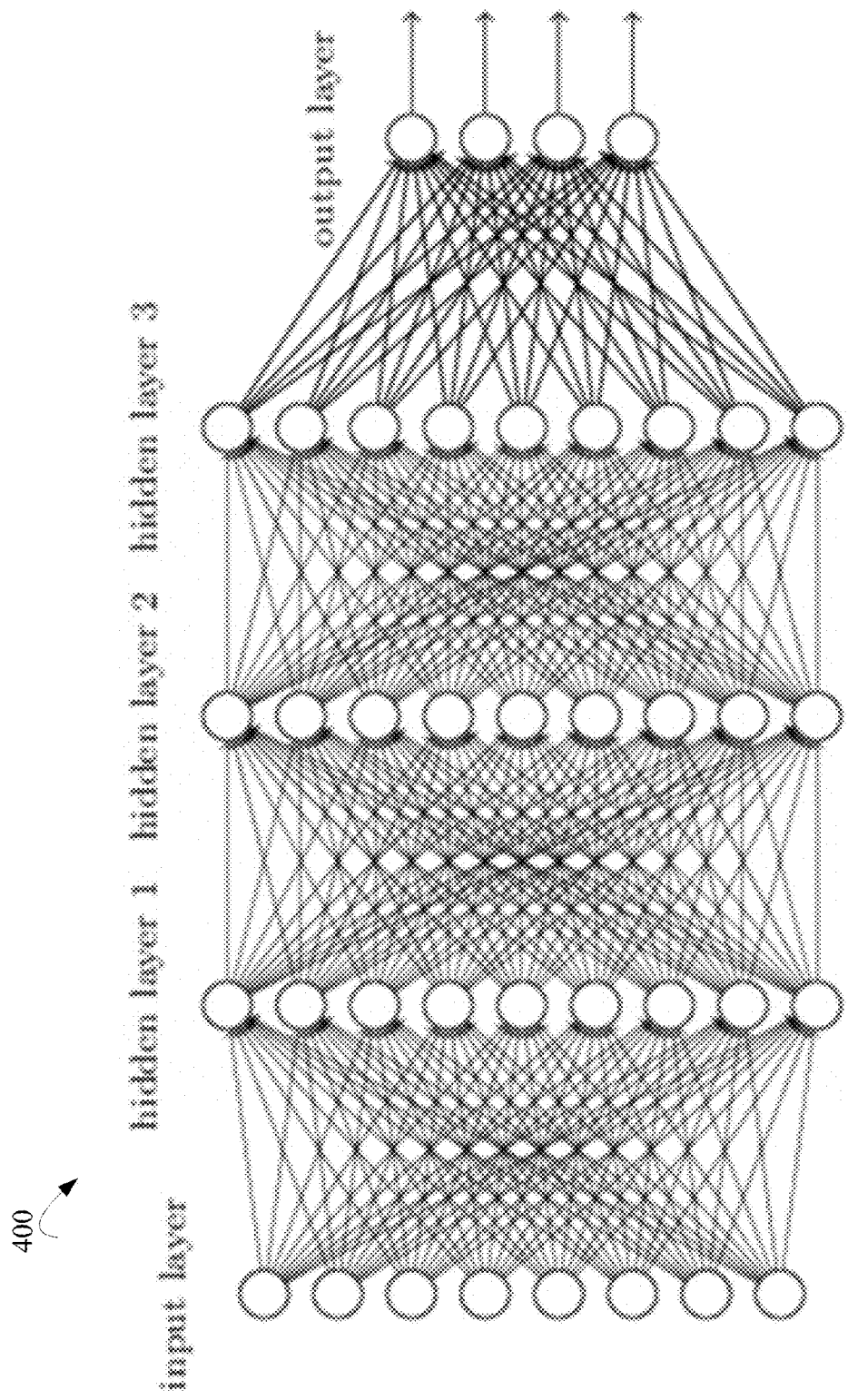
FIG. 4 is view of a neural network of the data processing system for managing one or more operations of the enterprise application in accordance with an embodiment of the invention.

Referring to FIG. 4, a neural network 400 for determination of data attribute weights of received dataset is provided in accordance with an embodiment of the invention. In an example implementation let us assume there is a single dataset with all different kinds of data such as application logs, transportation related data, system log, inventory related data, security logs, transaction logs, operational time etc. To classify this dataset the system deploys natural language processing (NLP) along with neural network. Since the data set includes varying data a single approach doesn't work. The system is configured to select necessary columns required in the data set and transforms text data to numerical data before applying machine learning data models on the columns. For processing the text, the system uses natural language processing (NLP) bag of words model and then each word in the text is assigned a column and its occurrence/frequency is determined. After processing the text by cleansing the dataset, the classified data is proceeded as input to the input layer of the neural network 400. The neural network utilizes one or more hidden layers based on the output and accuracy where the AI engine is configured to determine the number of hidden layers and a bot is configured to execute the processing of introducing the hidden layers automatically. The input to the neural network is the column extracted from the dataset and output describes the type of data such as log etc. The neural network decides the data attribute weights which are the links lines between the nodal points shown in FIG. 4. The lesser number of input layer and hidden layer, the faster the data classification is performed.

In an embodiment, the data set includes data elements received from at least one source in real-time such as the CPU percentage, Memory percentage, heap size, Number of active transactions, pod CPU threshold limit, Operating system event logs, newsfeed and trend of statistical and non-statistical values.

In an advantageous aspect, the system is a combination of Cognitive service and technical/business rules that provides suggestions and recommendations for optimizing the operational cost of the infrastructure. The system predicts the need for an increase in capacity based on storage or memory trend.

Figure 5:
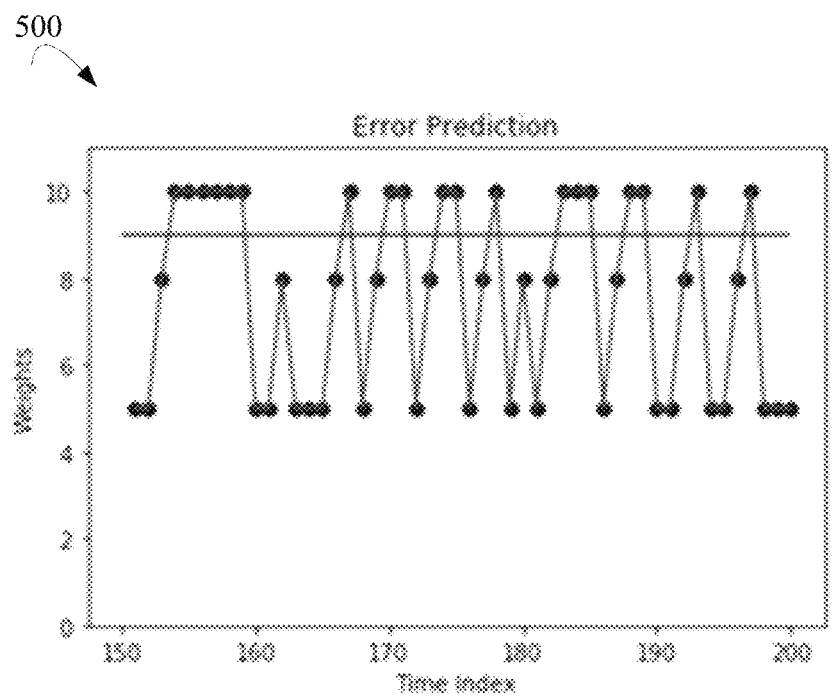
FIG. 5 is a graph depicting error log dataset data pattern with weights in accordance with an example embodiment of the invention.

In an example embodiment, the present invention predicts error by assigning weights to datasets such as error logs and warning logs upon its occurrence in a given time interval. The Artificial intelligence (AI) engine of the invention is configured to determine weights of errors logs based on the data script. In case the error logs are assigned a weight of say 5 in the scale of 1-10 and if the same error log repeats in a particular time duration the next 30 mins, the weightage increases to 8. Even if the error log resembles the earlier error and is not exactly the same, the AI engine identifies the relationship and predicts the similarity in the error. If another similar error occurs in say the next 30 mins it's weightage increases to 10. If it didn't occur in the next 30 mins, the system reduces the weight to 5. The weights are assigned to the log dataset based on some selected keywords and upon changing some of the weights, the model gets trained and this correlation is applied on the next dataset of events. The data pattern analysis of the dataset with error logs as dataset is depicted in graph 500 of FIG. 5 with weights on Y axis and time on X-axis.

Figure 5A:
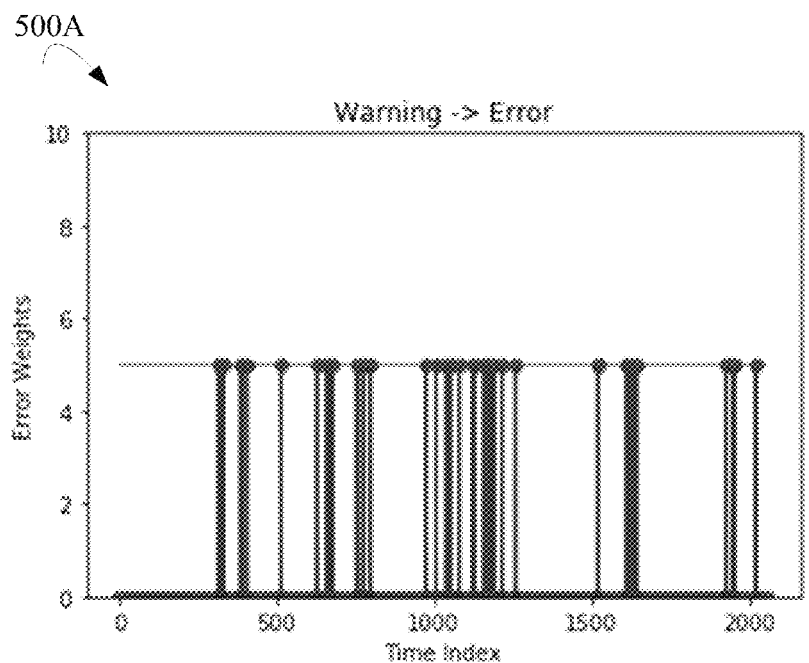
FIG. 5A is a graph depicting warning log data set data pattern with error weights in accordance with an example embodiment of the invention.

In another example embodiment, the data pattern analysis of the dataset with warning logs messages as a dataset is depicted in graph 500A of FIG. 5A. If a specified combination of warning logs from a particular source occur within a time period say, 30 mins the system increases the weight to 5 indicating that there is a chance for error.

Figure 6:
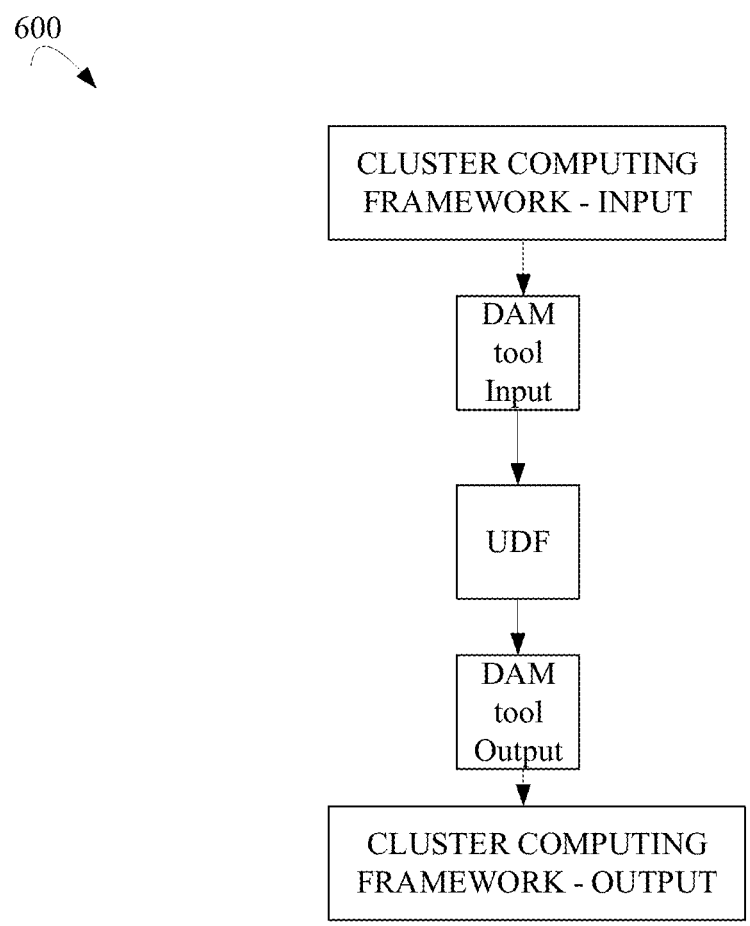
FIG. 6 is a grouped map data flow layer architecture in accordance with an embodiment of the invention.

Referring to FIG. 6, a grouped map data flow layer architecture 600 is shown in accordance with an embodiment of the invention. The data processing system utilizes big data tool and cluster computing framework for parallel computing to perform pre-processing and generating dataset characteristic data. The grouped map data flow layer includes a cluster computing framework input layer connected to at least one data acquisition and manipulation (DAM) tool input. The DAM tool input is provided to a user defined function (UDF) layer and a DAM output is obtained which is consumed at the cluster computing framework output layer. The UDF grouped mapping tool enables pre-processing, generates predicted values of the characteristic data and stores the historical dataset characteristic data results in the Data lake. The system enables automated inspection and Optimization. The processing logic checks on the number of data points and provides an estimate on the amount of time it would take to generate the prediction. Based on the time the cluster size is chosen and the data model parameters are chosen to optimize the code and render the prediction of the dataset characteristic within the estimated time frame.

In an advantageous aspect, the system of the present invention achieves a steady controlled increase in execution time with growing data and cluster size.

In an advantageous aspect, the system of the present invention is based on cloud-native platform for predictive analysis of dataset characteristic including outage/incident in enterprise application such as supply chain management applications. The system collects statistical and non-statistical data from different hybrid cloud services like Virtual machines, orchestrators, service fabric and any computational application, perform data cleansing, pattern analysis and generate prediction for future incidents/outages or required adjustments in operations. The system utilizes intelligent and well-trained machine learning models and AI enabling the platform to provide insights to users with real-time status of the shipment, delivery date, acknowledgment of Purchase order (PO), probable delay in shipment, inventory running low, transportation delays, etc. The System monitors end to end activities of all operations in the application and for any exceptions, alert/warning is triggered along with recommendations. The alert/warning can be classified as low, medium, and high based on the impact, prediction score, and the weightage given to that parameter.

In an exemplary embodiment, the present invention collates and scrubs data from one or more internal and external databases including ERPs, Vendor Management Systems, Newsfeeds from top Industry Sources, historical data, and inventory management systems for data analysis to predict dataset characteristic.

In an advantageous aspect, the system and method of the present invention enables efficient threat detection. The AI based system is a valuable addition to a strong security management posture. Heuristics and algorithms can mine traffic data for botnets, scripts or other threats that can take out a network. Especially when these threats are complex, multi-vector and layered, machine learning can expose patterns that can undermine operational or business service availability.

The infrastructure teams are faced with floods of alerts, and yet, there is only a handful that really matters. The system of the invention mine these alerts, use inference models to group them together, and identify upstream root-cause issues that are at the core of the problem. It transforms an overloaded inbox of alert emails into one or two notifications that really matter. The enterprise application is hosted across multiple cloud solutions, having different hosting solutions. Advantageously, the system of the present invention predicts infrastructure capacity depends on analysis of multiple datasets with varying parameters like time of the year, customer business domain, weather etc.

The system supports intelligent alerting and escalation. After root-cause alerts and issues are identified, IT ops teams are using artificial intelligence to automatically notify subject matter experts or teams of incidents for faster remediation. Artificial intelligence acts like a routing system, immediately setting the remediation workflow in motion by identifying relationships between datasets for predicting dataset characteristic such as an incident or outage.

The system of the invention enables Capacity optimization. This can also include predictive capacity planning and refers to the use of statistical analysis or AI-based analytics to optimize application availability and workloads across infrastructure. These analytics can proactively monitor raw utilization, bandwidth, CPU, memory and more, and help increase overall application uptime.

In an exemplary embodiment, the present invention enables predictive adjustment to operation in real time based on analysis of received dataset to determine characteristics of the dataset such as dataset conveying occurrence of an outage or incidence. With a predictive application, any downtime on the application is avoided and the user does not have any impact which in-turn results in significant savings. Intelligence that alerts to key approaching issues allows them to be proactively avoided. Also, the system detects any future security violations by predicting threats beforehand and stopping it. The system uses collected streaming network telemetry data to auto-discover, inventory and classify devices. Not only the system does an inventory network of infrastructure components, but it also assesses all wired, wireless and Internet of things (IoT) devices communicating on the corporate network or in the cloud. Further, all co-related operations or sub applications in the system upstream or downstream, are alerted on any impact with the predictive system. The system brings key machine learning techniques to enterprise application operations, including pattern matching, predictive analysis, historical data analysis, and causal analysis. This helps with decision making by enabling purely data-driven, automated responses. Such automated responses to incidents eliminate human error and data noise.

In an exemplary embodiment, the application user interface may enable cognitive computing to improve interaction between a user and the enterprise application(s). The intelligent interface provides insight into dynamically changing parameters such as key information obtained from live newsfeeds. The AI engine processes the newsfeed to draw relevance from the content and provide actionable insight to a user. Alternately, the system is configured to assign weights to type of news feeds and impact of certain news on one or more operations of the enterprise application. Further, in an advantageous aspect, the cognitive aspect of the invention enables a user to override an auto assessment by the AI engine if required.

In another exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A method for managing one or more operations in an enterprise application, the method comprising:
receiving at a server, at least one dataset from at least one source;
generating a cleansed dataset by cleansing the received dataset and storing the cleansed dataset in an operational database;
extracting at least one feature from the cleansed dataset based on probability data analysis of the extracted feature to generate an extracted feature dataset;

generating a classified dataset by classifying the extracted feature dataset based on a correlation obtained from one or more data models trained on a historical dataset; and identifying, by an AI engine, an impact of classified data in the classified dataset on one or more operations of the enterprise application to predict characteristics of the at least one dataset, wherein a linkedchain is configured to connect the classified dataset to one or more linkedchain nodes of the enterprise application through a linkedchain control module thereby enabling the control module to incorporate changes in the one or more operations of the application in real time based on the impact and predicted characteristics of the at least one dataset.

2. The method of claim 1, wherein the AI engine is coupled to a processor and configured to identify impact of the classified dataset on one or more linkedchain nodes of the enterprise application in real time based on a data pattern analysis wherein the linkedchain nodes connect to the one or more operations in the application.

3. The method of claim 2, wherein the linked-chain nodes connect to the one or more operations through configurable components of the enterprise application wherein the AI engine correlates the classified dataset with the one or more linked-chain nodes based on a data script created by utilizing a library of functions stored on a functional database.

4. The method of claim 1, wherein the at least one dataset includes data elements received from at least one source in real-time such as the CPU percentage, Memory percentage, heap size, Number of active transactions, pod CPU threshold limit, Operating system event logs, newsfeed and trend of statistical and non-statistical values.

5. The method of claim 1, wherein the characteristic of the at least one dataset includes intent of an information conveyed through the dataset wherein the characteristics and impact enable the AI engine to predict in real time one or more adjustments required in execution of the impacted operations and at least one infrastructure capacity associated with those operations.

6. The method of claim 5, wherein the infrastructure capacity includes sizing of compute services, databases, network bandwidth, sizing of operational objects configured to execute the one or more operations.

7. The method of claim 1, wherein the one or more nodes are block-chain network nodes connected to one or more data blocks of the block chain network.

8. The method of claim 1, wherein the one or more nodes are non-block chain network nodes configured to authenticate the received dataset before connecting through the linkedchain control module.

9. The method of claim 7, wherein a prediction of a security outage by the AI engine triggers the block chain network nodes to identify associated operations of the application impacted by the outage and initiate an adjustment action to mitigate any risk associated with execution of the impacted block chain nodes and operations of the enterprise application.

10. The method of claim 9, further comprises:
processing a historical dataset characteristic data and the classified data to predict the characteristic for recommending the adjustment action based on a dynamic processing logic.

11. The method of claim 10, wherein the dynamic processing logic integrates deep learning, predictive analysis, data extraction, impact analysis, configuration pattern generation and bots for processing the classified dataset and historical dataset characteristic data to recommend the action.

12. The method of claim 11, wherein the one or more operations include demand planning, supply planning, inventory management, warehouse management, forecasting, cost modelling, transportation management, product life cycle management, purchase Order and sales management, work order management, receivables, supplier collaboration management, in the enterprise application including an ERP or a supply chain management application.

13. The method of claim 11, further comprising:
cleansing the received dataset by removing unwanted text from the received dataset and extracting feature based on the probability analysis of the dataset for creating the extracted feature dataset;

creating a sparse matrix of the extracted feature dataset; and applying one or more data models to the sparse data matrix for classifying the extracted dataset to predict values.

14. The method of claim 13, wherein the one or more data models are trained by
fetching a plurality of code vectors from a set of normalized historical dataset;

extracting a plurality of distinct data from the normalized historical dataset to create a list of variables;

transforming the normalized historical dataset into a training data matrix using the list of variables; and creating one or more data models from the code vector and the training data matrix using machine learning (ML) and artificial intelligence (AI).

15. The method of claim 14, wherein the step of creating the one or more data models further includes:
reading the training data matrix and the plurality of code vectors;

applying Naive Bayes (NB) algorithm to train a Bayes model for the normalized historical dataset by using machine learning engine (MLE);

applying Support Vector Machine (SVM) algorithm to obtain SVM models by using machine learning engine (MLE);

applying Logistic Regression (LR) algorithms to obtain LR models by using machine learning engine (MLE); and saving NB, SVM and LR models as the data models for classification of received dataset in a data model database.

16. The method of claim 13, wherein the step of extracting feature from the received dataset based on probability analysis is performed by $$\chi^2 = \sum_{i=1}^{m} \sum_{j=1}^{k} \frac{(O_{ij} - E_{ij})^2}{E_{ij}}$$

where, x is extracted feature value
Oi is observed frequency value
Ei is expected frequency value
wherein extracted feature dataset contributes most to prediction of neural network output.

17. The method of claim 16, further comprising:
Identifying, by a neural network, one or more data attribute weights assigned to the classified data by the one or more data model, wherein the classified data is an input to the neural network and output is a testing data set.

18. The method of claim 17, further comprising:
dividing the historical dataset into training data set and testing data set;
generating a prediction for the testing dataset using the training dataset through the one or more data models;
providing the classified data as input to the neural network and testing data as the output to identify the one or more data attribute weights; and
determining an optimum data attribute weight from the identified one or more data attribute weights by the neural network.

19. The method of claim 18, wherein the data attribute weights vary dynamically depending on frequency of occurrence of the dataset characteristic over a time period, wherein the AI engine is configured to modify the weights assigned to the dataset for predicting the dataset characteristic enabling initiation of an adjustment action based on the data attribute weight data pattern analysis through a bot.

20. A system for managing one or more operations in an enterprise application, the system comprises:
a data cleansing tool configured to cleanse at least one dataset received from at least one data source to generate a cleansed dataset;
a feature extractor configured to extract at least one feature from the cleansed dataset based on probability data analysis of the extracted feature to generate an extracted feature dataset;
a data classification tool coupled to a neural network and configured to classify the extracted feature dataset based on a correlation obtained from one or more data models trained on a historical dataset for generating a classified dataset; and
an AI engine coupled to a processor and configured to identify an impact of the classified data on one or more operations of the enterprise application to predict characteristic of the at least one dataset, wherein a linkedchain is configured to connect the classified dataset to one or more linkedchain nodes of the enterprise application through a linkedchain control module thereby enabling the control module to incorporate changes in the one or more operations of the application in real time based on the impact and the dataset characteristic prediction.

21. The system of claim 20, further comprising:
one or more linkedchain nodes configured to connect the one or more operations of the enterprise application, wherein the AI engine identifies impact of the classified dataset on the one or more linkedchain nodes based on a data pattern analysis.

22. The system of claim 20, wherein the linked chain nodes connect to the one or more operations through configurable components of the enterprise application, wherein the AI engine corelates the classified dataset with the one or more linked-chain nodes based on a data script created by utilizing a library of functions stored on a functional database.

23. The system of claim 22, further comprising a linkedchain sync object of the linked-chain node configured to synchronize the control module with the classified dataset.

24. The system of claim 23, further comprising a linkedchain sync database configured to store a plurality of sync data for linking the classified dataset with the linked chain nodes of the enterprise application.

25. The system of claim 24, wherein the enterprise application is developed with configurable components by a platform architecture configured for codeless development of the application thereby enabling the system to reconfigure linkedchain node connections depending on the one or more operations to be executed.

26. The system of claim 24, wherein the one or more nodes are block-chain network nodes connected to one or more data blocks of the block chain network.

27. The system of claim 26, wherein a prediction of a security outage by the AI engine triggers the block chain network nodes to identify associated operations of the application impacted by the outage and initiating a mitigation action to mitigate the risk associated with execution of the impacted nodes and operations of the enterprise application.

28. The system of claim 24, wherein the one or more nodes are non-block chain network nodes configured to authenticate the data before connecting through the control module.

29. The system of claim 24, further comprising a controller encoded with instructions enabling the controller to function as a bot for processing a mitigation data script to recommend the mitigation action based on a dynamic processing logic wherein a historical dataset characteristic data stored in a historical dataset characteristic database and the classified data are processed by the processor coupled to the AI engine for predicting the dataset characteristic thereby enabling recommendation of the adjustment action in real time.

30. The system of claim 29, wherein the dynamic processing logic integrates deep learning, predictive analysis, data extraction, impact analysis, configuration pattern generation and bots for processing the classified dataset and historical dataset characteristic data to recommend the action.

31. The system of claim 30, wherein the one or more operations include demand planning, supply planning, inventory management, warehouse management, forecasting, cost modelling, transportation management, product life cycle management, purchase Order and sales management, work order management, receivables, supplier collaboration management, in the enterprise application including an ERP or a supply chain management application.

32. The system of claim 31, wherein the neural network is configured for identifying one or more data attribute weights assigned to the classified data set by the one or more data model wherein the classified data set is an input to the neural network and output is a testing data set.

33. The system of claim 32, further comprising:
a training data set database and a testing data set database wherein the historical dataset characteristic data is divided into training data set and testing data set; and
a data models database configured for storing the one or more data models wherein a prediction data for the testing dataset is generated using the training data set through the one or more data models.

34. A non-transitory computer-readable storage medium coupled to one or more processors and having instructions stored thereon which, when executed by the one or more processors, cause the one or more processors to perform method of managing one or more operations in an enterprise application, the method comprising:
receiving at a server, at least one dataset from at least one source;

generating a cleansed dataset by cleansing the received dataset and storing the cleansed dataset in an operational database;

extracting at least one feature from the cleansed dataset based on probability data analysis of the extracted feature to generate an extracted feature dataset;

generating a classified dataset by classifying the extracted feature dataset based on a correlation obtained from one or more data models trained on a historical dataset; and identifying, by an AI engine, an impact of classified data in the classified dataset on one or more operations of the enterprise application to predict characteristics of the at least one dataset, wherein a linkedchain is configured to connect the classified dataset to one or more linkedchain nodes of the enterprise application through a linkedchain control module thereby enabling the control module to incorporate changes in the one or more operations of the application in real time based on the impact and the dataset characteristic prediction.

* * * * *